(12) United States Patent
Tretter

(10) Patent No.: US 6,463,173 B1
(45) Date of Patent: Oct. 8, 2002

(54) SYSTEM AND METHOD FOR HISTOGRAM-BASED IMAGE CONTRAST ENHANCEMENT

(75) Inventor: Daniel R. Tretter, Mountain View, CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 08/550,435

(22) Filed: Oct. 30, 1995

(51) Int. Cl.[7] ................................................ G06K 9/00
(52) U.S. Cl. ...................... 382/168; 382/169; 382/170; 382/162; 382/225
(58) Field of Search ................................ 382/168–172, 382/190, 195, 203, 224, 225, 228

(56) References Cited

U.S. PATENT DOCUMENTS 5,179,528 A    1/1993  Robertson et al. ..... 364/715.02
5,249,241 A  * 9/1993  Silverman et al. .......... 382/169

OTHER PUBLICATIONS

John C. Ross—The Image Processing Handbook; 2nd Edition, CRC Press, 1994, p. 218.*

Rafael C. Gonzalez, Richard E. Woods Digital "Image Processing" Addison–Wesley Publ. Company, 1992, p. 174.*

Peng–Yeng Yin and Ling–Hwei Chen, "Random–sampling thresholding: A New Approach to Multi–Level Thresholding", Signal Processing European Journal Devoted 2–4 to the Methods and Applications of Signal Processing, vol. 36, No. 3, Dec. 1, 1993, pp. 311–322.

Misna, Phillip A. et al, "Explosion of Multidimensional Image Histograms", 1994 IEEE International Conference on Image Processing, vol. III, Nov. 13–16, 1994, Austin Texas, pp. 958–962.

Papamarkos. N. et al., "A New Approach for Multilevel Threshold Selection", CVGIP: Graphical Models and Image Processing, vol. 56, No. 5, Sep. 1994, pp. 357–370.

Vinod, V.V. et al., "A Connectionist Approach for Clustering with Applications in Image Analysis", IEEE Transaction on Systems, Man, and Cybernetics, vol. 24, No. 3, Mar. 1994.

S.S.Y. Lau, "Global Image Enhancement Using Local Information", Electronics Letters, vol. 30, No. 2, Jan. 20, 1994, pp. 122–123.

Stark, J.A. et al., "Model–based Adaptive Histogram Equalization", Signal Processing 39, 1994, pp. 193–200.

Trahanias, P.E. et al., "Color Image Enhancement through 3–D Histogram Equalization", 11th IAPR Conference on Pattern Recognition, vol. II, Conference C: Image, Speech and Signal Analysis, Aug. 30–Sep. 3, 1992, The Hague, Netherlands, pp. 545–548.

Vossepoel, Albert M., "Adaptive Histogram Equalization Using Variable Regions", 9th. International Conference on Pattern Recognition, 1988, pp. 351–353.

(List continued on next page.)

Primary Examiner—Phuoc Tran

(57) ABSTRACT

A method of operating a computer to produce contrast enhanced digital images commences with the step of producing a histogram of having a first axis corresponding to a measurable property (e.g., luminance) and a second axis corresponding to a count of pixels having a particular value for the measurable property. This histogram is divided into clusters and histogram equalization or stretching is performed on each cluster thereby producing a modified histogram. Using said modified histogram to adjust the value of said first measurable property in said digital form, thereby producing a contrast enhanced image. The histogram is divided into clusters using a pattern matching technique. For example, patterns in the histogram that resemble gaussian distributions and patterns that resemble uniform distributions are separated into individual clusters.

17 Claims, 12 Drawing Sheets

OTHER PUBLICATIONS

Zhang, Y.j., "Improving the Accuracy of Direct Histogram Specification", Electronics Letters, Jan. 30, 1992, vol. 28, No. 3, pp. 213–214.

Riskin, Eve A., et al., "A Greedy Tree Growing Algorithm for the Design of Variable Rate Vector Quantizers", IEEE Transactions on Signal Processing, vol. 39, N. 11, Nov. 1991, pp. 2500–2507.

Yang, Xue–Dong et al., "Direct Mapping Between Histograms: An Improved Interactive Image Enhancement Method", Proceedings of 1991 IEEE International Conference on Systems, Man and Cybernetics, Decision Aiding for Complex Systems, vol. 1, Oct. 13–16, 1991, Charlottesville, VA, pp. 243–247.

Jolion, Jean–Michel et al., "Robust Clustering with Applications in Computer Vision", IEEE Transactions on Pattern Analysis and Machine Intelligence, vol. 13, No. 8, Aug. 1991, pp. 791–802.

Zimmerman, John B. et al., "An Evaluation of the Effectiveness of Adaptive Histogram Equalization for Contrast Enhancement", IEEE Transactions on Medical Imaging, vol. 7, No. 4, Dec. 1984, pp. 304–312.

Sahoo, P.K. et al., "A Survey of Thresholding Techniques", Computer Vision, Graphics, and Image Processing 41, No. 2, Feb. 1988, pp. 233–260.

Pizer, Stephen M. et al., "Adaptive Histogram Equalization and Its Variations", Computer Vision, Graphics, and Image Processing 39, 1987, pp. 355–368.

Strickland, Robin N. et al., "Digital Color Image Enhancement Based on the Saturation Component", Optical Engineering, Jul. 1987, vol. 26, No. 7, pp. 609–615.

Bockstein, Ilia M., "Color Equalization Method and Its Application to Color Image Processing", Journal of the Optical Society of America, vol. 3, No. 5, May 1986, pp. 735–737.

Kapur, J.N. et al., "A New Method for Gray–Level Picture Thresholding Using the Entropy of the Histogram", Computer Vision, Graphics, and Image Processing 29, No. 3, 1985, pp. 273–285.

Reddi, S.S. et al., "An Optical Multiple Threshold Scheme for Image Segmentation", IEEE Transactions on Systems, Man, and Cybernetics, vol. SMC–14, No. 4, Jul./Aug. 1984, pp. 661–665.

Kullback, S. et al., "On Information and Sufficiency", Annals of Mathematical Statistics, vol. 22, 1951, pp. 79–87.

* cited by examiner

SYSTEM AND METHOD FOR HISTOGRAM-BASED IMAGE CONTRAST ENHANCEMENT

FIELD OF THE INVENTION

The present invention relates to image processing, and more particularly to contrast enhancement of images by histogram manipulation.

BACKGROUND OF THE RELATED ART

A digital image is an array, usually a rectangular matrix, of pixels. Each pixel is one picture element and is a digital quantity that is a value that represents some property of the image at the location in the array corresponding to a particular location in the image. Typically, in continuous tone black and white images the pixel values represent a gray scale value.

Pixel values for an image have to conform to a specified range. For example, each array element may be one byte, i.e., eight bits. In that example, the pixel values must range from 0 to 255. In a gray scale image a 255 may represent absolute white and 0 total black.

Color images consist of three color planes, generally corresponding to red, green, and blue (RGB). For a particular pixel, there is one value for each of these color planes, i.e., a value representing the red component, a value representing the green component, and a value representing the blue component. By varying the intensity of these three components, all colors in the color spectrum may be created.

Output devices, such as printers and displays, also have particular ranges for pixel values. A particular device may be configured to accept and output eight-bit image data, i.e., pixel values in the range 0 to 255.

However, many images do not have pixel values that make effective use of the full dynamic range of pixel values available on an output device. For example, in the eight-bit case, a particular image may in its digital form only contain pixel values ranging from 100 to 150, i.e., the pixels fall somewhere in the middle of the gray scale. Similarly, an eight-bit color image may also have RGB values that fall within a range some where in middle of the range available for the output device. The result in either case is that the output is relatively dull in appearance.

The visual appearance of an image can often be improved by remapping the pixel values to take advantage of the full range of possible outputs. That procedure is called contrast enhancement.

There are several prior art contrast enhancement techniques. These techniques are especially common for monochrome (e.g., gray scale) images, such as from medical (e.g., cat-scans, x-rays, and ultrasound) and radar sources. In such applications, contrast enhancement can be used to find image details that would otherwise be difficult to discern.

Contrast enhancement techniques are often based on histogram equalization. In histogram equalization a histogram of gray level distribution of the image is constructed. FIG. 1 is an example of such a histogram. A histogram is a one dimensional array with an array element corresponding to each value in the range of pixel values. Each histogram element contains a count of the number of pixels that have the particular pixel value corresponding to that element. In histogram equalization, the pixel values in the image are altered to make the distribution of gray level values as uniform as possible. Histogram equalization is described in A. K. Jain, *Fundamentals of Digital Image Processing*, Prentice-Hall, Inc., 1989, pp. 241–243.

A variation of histogram equalization, known as adaptive histogram equalization or local area histogram equalization, uses a sliding window to define an image region for each pixel. The histogram of that region is then equalized to determine the output value for the pixel. Adaptive histogram equalization is described in John B. Zimmerman, et al., An evaluation of the effectiveness of adaptive histogram equalization for contrast enhancement, *IEEE Trans. On Medical Imaging*, 7 (4):304–312, December 1988. The adaptive histogram equalization procedure is computationally very expensive because a separate histogram is constructed for each image pixel. A number of region-based variants of adaptive histogram equalization have been proposed in Stephen Pizer et al., Adaptive histogram equalization and its variations, *Computer Vision, Graphics, and Image Processing*, 39 (3):355–368, September 1987; S. S. Y. Lau, Global image enhancement using local information, *Electronics Letters*, 30 (2):122–123, January 1994; J. A. Stark and W. J. Fitzgerald, Model-based adaptive histogram equalization, *Signal Processing*, 37:193–200, 1994. These techniques give comparable results to adaptive histogram equalization while reducing computation.

Deficiencies common to adaptive histogram variants are that although some variants reduce computation requirements substantially relative to full-blown adaptive histogram equalization, the required computation is still significant enough to be impractical in many applications.

A further deficiency of adaptive histogram variants is that because these schemes adjust image pixel values locally, the processed image will not retain the relative lightness of pixels from the original image. For example, some details in a shadow region may be lightened to the point where these details are lighter than sunlit parts of the same image. The uneven lightening/darkening of an image leads to unacceptable visual appearance in photographic images.

A generalization of histogram equalization, known as histogram specification, adjusts the data so the output histogram has a distribution close to some desired distribution. Histogram specification is described in Jain, supra, page 243.

Color image enhancement is considerably more complicated. Color images consist of three color planes, generally corresponding to red, green, and blue (RGB). One simple color image enhancement technique (described in P. E. Trahanias and A. N. Venetsanopoulos, Color image enhancement through 3-d histogram equalization, 11*th IAPR Conference on Pattern Recognition, Conference C: Image, Speech, and Signal Analysis*, pp. 545–548, September 1992) is to perform histogram equalization on each color independently. However, that technique can cause large color shifts and other undesirable artifacts in the image.

One histogram-based contrast enhancement technique that attempts to avoid such artifacts is to construct a three dimensional histogram and perform modifications in all three dimensions jointly. That technique is described in Trahanias and Venetsanopoulos, above, and in Phillip A. Mlsna and Jeffrey J. Rodriguez, Explosion of multidimensional image histograms. *IEEE International Conference on Image Processing, Vol III*, pp. 958–962, Austin, Tx., November 1994. Unfortunately, the required computation for the technique of joint modification of a three-dimensional histogram is at least on the order of the number of occupied histogram bins, which can number in excess of a hundred thousand for a moderately large image. This approach is therefore computationally intensive and hence not very practical.

Other approaches, including the preferred embodiment of the present invention, transform the image data into some luminance-chrominance color space and perform the enhancement in this domain. Some techniques adjust only the luminance histogram, while others adjust both luminance and chrominance histograms. Straightforward histogram equalization on the luminance component can cause undesirable artifacts in the output image. Specifically, large areas of approximately equal luminance can suffer from contouring artifacts, while an especially dark (light) background can cause the foreground objects to become too light (dark). Some of the more complicated enhancement procedures require that the image data undergo a nonlinear transformation before processing, which increases the computational complexity. Histogram equalization of luminance or chrominance histograms is described in Robin N. Strickland, et al., Digital color image enhancement based on the saturation component, *Optical Engineering*, 26 (7):609–616, July 1987, and in Ilia M. Bockstein, Color equalization method and its application to color image processing, *Journal of the Optical Society of America A*, 3 (5):735–737, May 1986.

Histogram manipulation has also been used for purposes other than contrast enhancement. For example, for monochrome images, multi-thresholding techniques have been developed for dividing a histogram into clusters. The resulting clusters are then used to segment the image into regions corresponding to various objects and backgrounds. Such clustering techniques are described in P. K. Sahoo, et al., A survey of thresholding techniques, *Computer Vision, Graphics, and Image Processing*, 41 (2):233–260, February 1988. If the histogram contains flat regions of low amplitude between higher peaks, for example, a threshold value anywhere in the flat region would give nearly the same segmentation of the image. For the purpose of contrast enhancement, it is desirable to differentiate between regions of high activity and regions with little activity. Consequently, it is desirable to divide the histogram such that flat regions of low amplitude form separate clusters. Therefore, the multi-thresholding clustering techniques are not suited to color contrast enhancement.

Accordingly, it is desirable to have a contrast enhancement technique that is not computationally intensive and does not introduce undesirable artifacts in the output image.

SUMMARY OF THE INVENTION

A first embodiment of the invention is a method of operating a computer to produce contrast enhanced digital images. The method commences with the step of producing a histogram having a first axis corresponding to a measurable property (e.g., luminance) and a second axis corresponding to a count of pixels having a particular value for the measurable property. This histogram is divided into clusters and histogram equalization or stretching is performed on each cluster thereby producing a modified histogram. The modified histogram is used to adjust the value of said first measurable property in said digital form, thereby producing a contrast enhanced image.

In one embodiment of the invention the histogram is divided into clusters using a pattern matching technique. For example, patterns in the histogram that resemble gaussian distributions and patterns that resemble uniform distributions are separated into individual clusters.

In another embodiment of the invention, the histogram is partitioned into clusters of equal size.

In a further embodiment of the invention, subsequent to dividing the histogram into clusters, the cluster boundaries are remapped proportionally to the cluster's range, the number of pixels in the range, the total number of pixels in the image, and the histogram extent.

In another embodiment of the invention, some other property (e.g., chrominance) of the image is used to limit the values of the modified histogram.

In a further embodiment, the invention is practiced on a computer system for image processing having a histogram producing unit operable to produce a histogram data structure in a memory on the computer system. The computer system further contains a clusterizer connected to the histogram data structure and is operable to partition the histogram data structure into clusters. A histogram cluster boundary adjuster is connected to the histogram data structure and is operable to adjust boundaries of each cluster in said data structure such that said boundaries conform to a function having the parameters cluster width (Ro), a count of pixels in the cluster (Ni), a count of pixels in the image (Nt), the original histogram extent (Eo), and a desired histogram extent (Ed). A histogram adjuster is also connected to said histogram data structure and is operable to modify the histogram for each such cluster according to a desired characteristic.

In another embodiment of the invention, the clusterizer partitions the histogram data structure into equal size clusters.

DETAILED DESCRIPTION OF THE PREFERRED EMBODIMENTS

The present invention may be practiced on a general purpose computer system, on a special purpose image processing system, in software used for image processing, in device drivers and other applications involving digital image manipulation. For illustrative purposes, the present invention is described below in the context of a device driver that is loaded into a general purpose computer for execution when an image is output on a particular device controlled by the device driver.

A. Computer System Description

Figure 1:
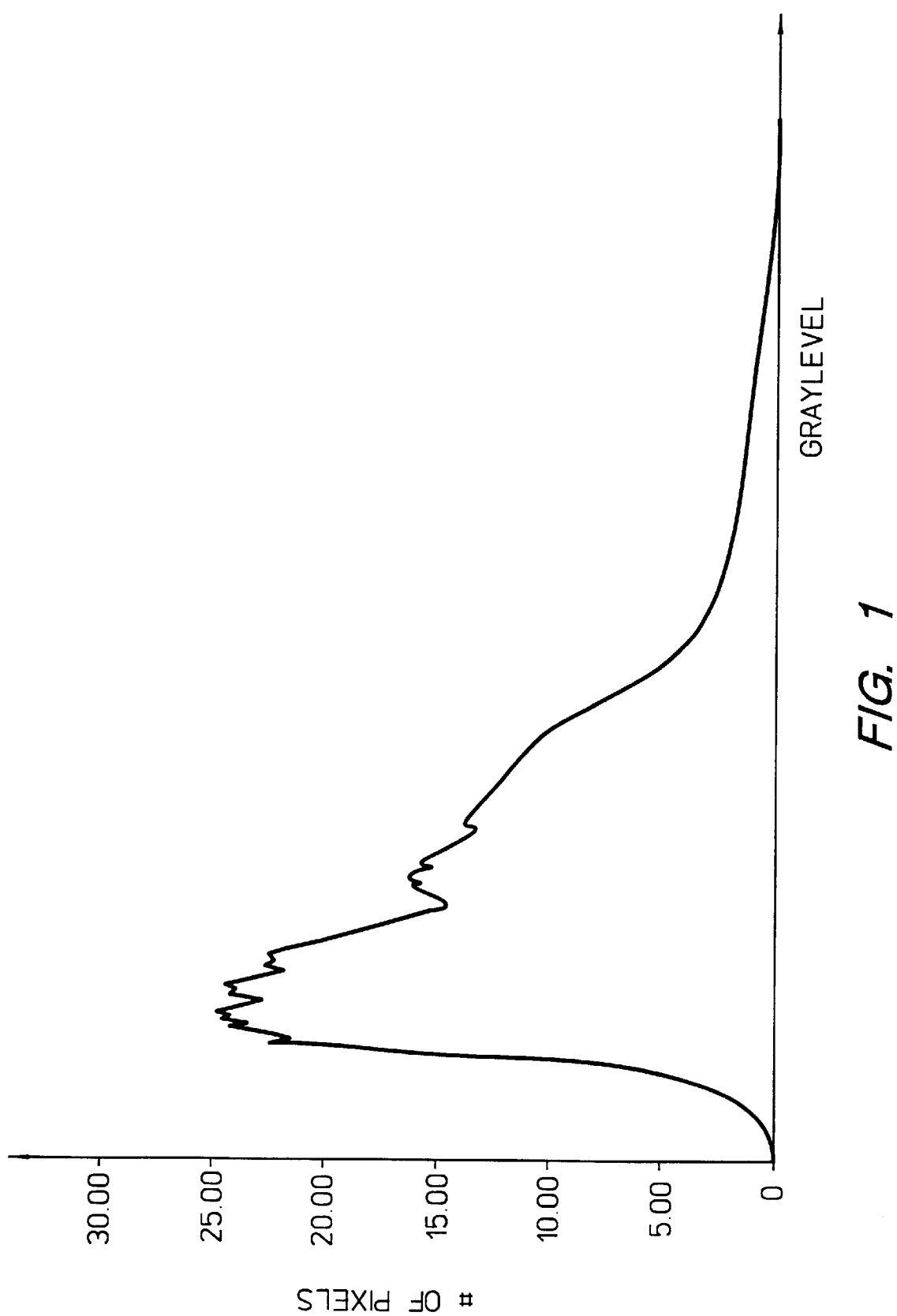
FIG. 1 is an exemplary histogram showing the number of pixels of an image having each valid gray level value.
Figure 2:
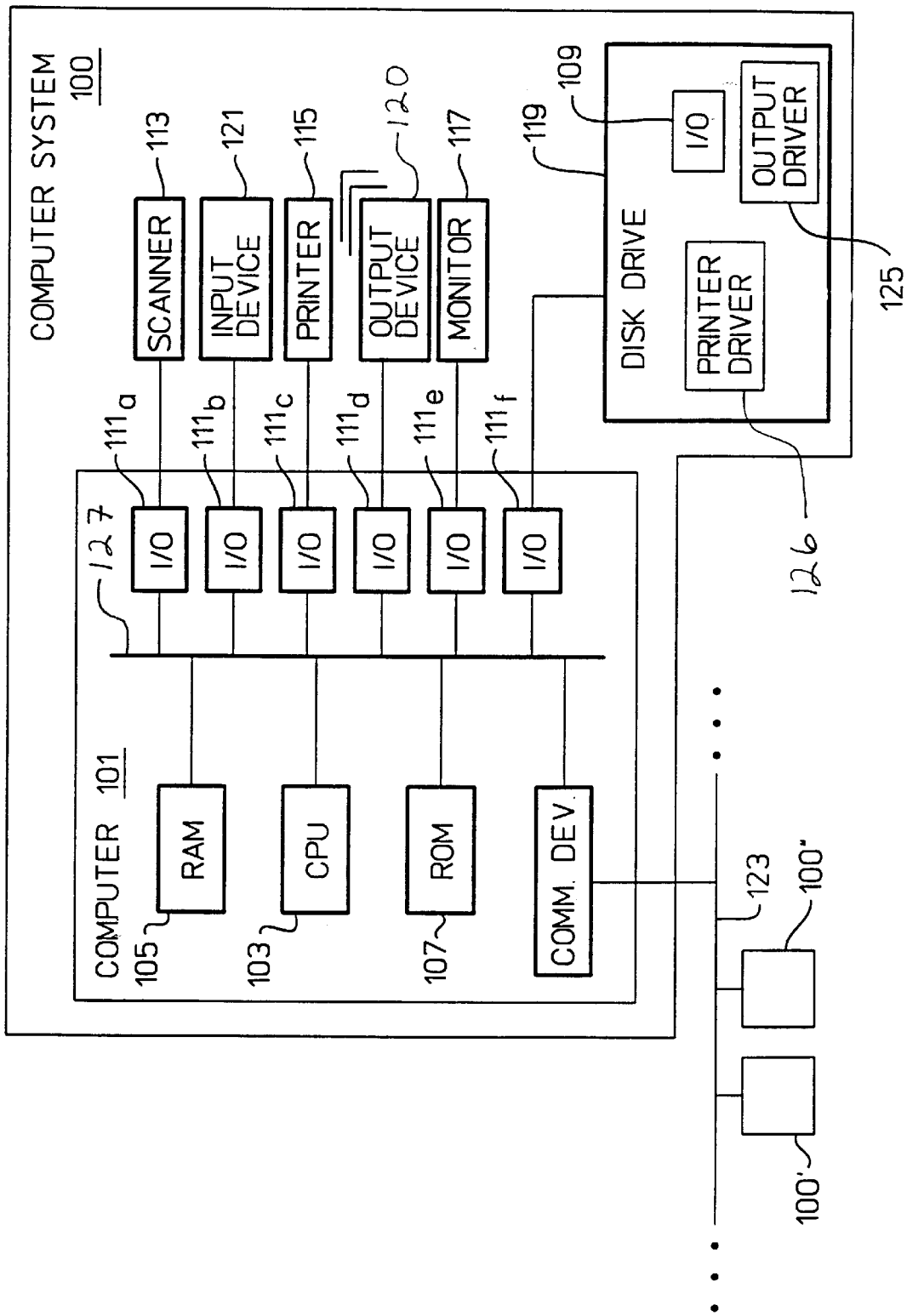
FIG. 2 is a block diagram of a computer system in which the present invention is used to enhance the contrast of digitized images.

FIG. 2 is a block diagram of a computer system 100 in which the present invention is used to enhance the contrast of digitized images. The computer system 100 consists of a computer 101 connected to several input-output devices, e.g., a scanner 113, a printer 115, a monitor 117, and one or more disk drives 119. The computer 101 may be connected to other input devices 121. These other input devices 121 may include one or more of the following: frame grabbers, CCD cameras, CD ROM drives, digital cameras, medical imaging devices such as CAT-scan, X-ray, and ultrasound.

The computer 101 consists of a central processing unit (CPU) 103 and a random access memory (RAM) 105. The computer 101 may further contain a read only memory (ROM) 107. These devices are connected to one another via bus 127. The computer 101 may also contain input-output control units 111a through 111f connected to the input-output devices 113 through 121.

In the operation as a digital image processing system, a digitized image is input to the computer 101. The source of the image may be a scanner 113. The source of the digitized image may also be another source of digitized images, such as, photo cd, a digital camera (e.g., a CCD (charged coupled devices) camera), or a frame grabber.

Furthermore, the computer system 100 may be connected via a network 123 to other computer systems 100' and 100", etc. The digitized images may then be down-loaded onto system 100 from one or more of these other computer systems 100' and 100".

An image may be scanned directly into the RAM 105 of the computer 101 or an image 109 may be stored in secondary storage, such as, the disk drive 119. Depending on its size, the disk drive 119 can store a large number of digitized images. The disk drive 119 also contains one or more output drivers 125 and a printer driver 126. There is an output driver 125 associated with each output device 115. The output devices are may be printers, e.g., color ink jet printers or color laser printers, such as those manufactured by the Hewlett-Packard Company, Palo Alto, Calif. The output devices may also include dye sublimation printers, e.g., the Kodak Colorease printer.

When the operating system software (not shown) of the computer 101 encounters a command to output an image 109 on one of the output devices 115, it loads the appropriate output driver 125 into the RAM 105.

In an alternative embodiments, the output driver is stored in ROM 107. In such embodiments, the step of loading the output driver is not necessary.

Figure 3:
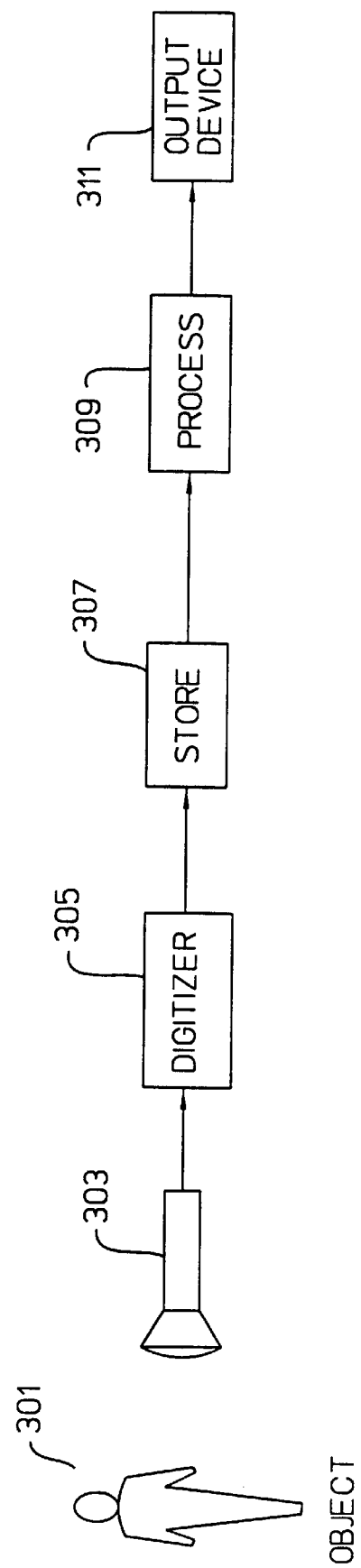
FIG. 3 is a block diagram of the process flow of an image processing system.

FIG. 3 is a block diagram of the process flow of an image processing system. An image of an object 301 is captured by an imaging device 303. A digitizer 305 converts the image into a digital representation. The digital version of the image is then stored 307 into a storage device, e.g., the RAM 105. Subsequent to storing the image is retrieved from the storage device and processed 309. Processing 309 may either be done by the CPU 103, or by processors located in the input devices or output devices. Processing 309 may further be partitioned between input, output, and main computer system processors. Finally, the processed image is output 311 onto some form of output device, e.g., printer 115.

It should be noted that the contrast enhancer of the present invention may be employed at any stage in the process flow of FIG. 3.

B. Device Drivers

Figure 4:
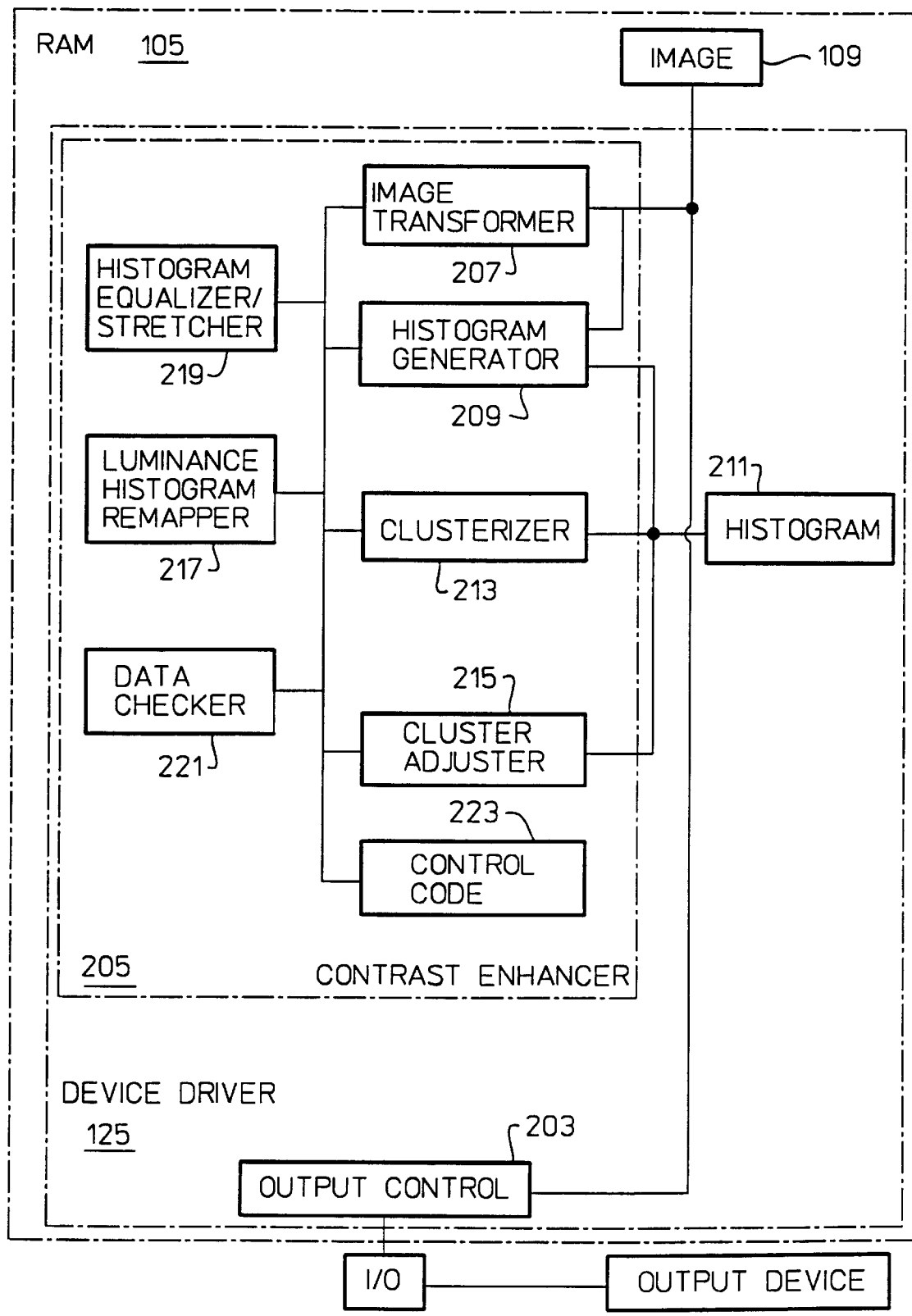
FIG. 4 is a block diagram of an image processing system having a contrast enhancer according to the present invention.

FIG. 4 is a block diagram of an image processing system having a contrast enhancer according to the present invention. FIG. 4 shows a device driver 125 loaded into the RAM 105. The output driver 125 consists of a contrast enhancer 205 and an output control 203. The output control 203 accepts as input digitized images and outputs control instructions to the output device 115. For a printer driver, the printer driver (output driver) includes instructions to control the amount and placement of ink of various colors on the output medium.

The contrast enhancer 205 is connected to a data structure for storing a histogram 211 of some property of the image 109. In one embodiment, the histogram property is luminance, i.e., the histogram 211 contains an entry for each possible luminance value for the particular output device 115 and each such luminance value entry is the number of pixels that has that particular luminance value.

The contrast enhancer 205 contains several modules. A first module is an image transformer 207. The image transformer 207 accepts as input an image 109 in one format and transforms it into an image having at least one property used for contrast enhancement. In one embodiment, luminance is used for contrast enhancement, thus, the image transformer 207 transforms the input image 109 into a representation having a luminance component, e.g., YCrCb or CIELab color coordinate systems. The functionality of the image transformer 207 is described in greater detail below in conjunction with FIG. 5.

The contrast enhancer 205 contains a histogram generator 209. The histogram generator 209 counts the number of pixels having each value in the range of values allowable for the particular property used for contrast adjustment of the image. These pixel counts are stored in a one dimensional histogram array 211 in the RAM 125. In one embodiment, luminance is used for contrast enhancement. Thus, in that embodiment, the histogram contains counts of pixels having each valid luminance value.

The contrast enhancer 205 further contains a clusterizer 213 for determining clusters in the histogram 211. The operation of the clusterizer 213 is described in greater detail below in the section entitled "Clusterizer".

Having established clusters in the histogram 211, the contrast enhancer 205 calls upon a cluster adjuster 215 to adjust the boundaries of the various clusters.

Histogram equalization or histogram stretching is then performed on the adjusted clusters by a histogram equalizer/stretcher 219. And using the output histogram, the pixel values are remapped by a luminance histogram remapper 217.

A data checker 221 verifies that output values remain within allowed bounds for the particular color space used by the embodiment of the invention.

The various modules of the contrast enhancer 205 are controlled by a control program 223. The control program 223 implements the flow-diagram of FIG. 5.

C. Contrast Enhancer

Figure 5:
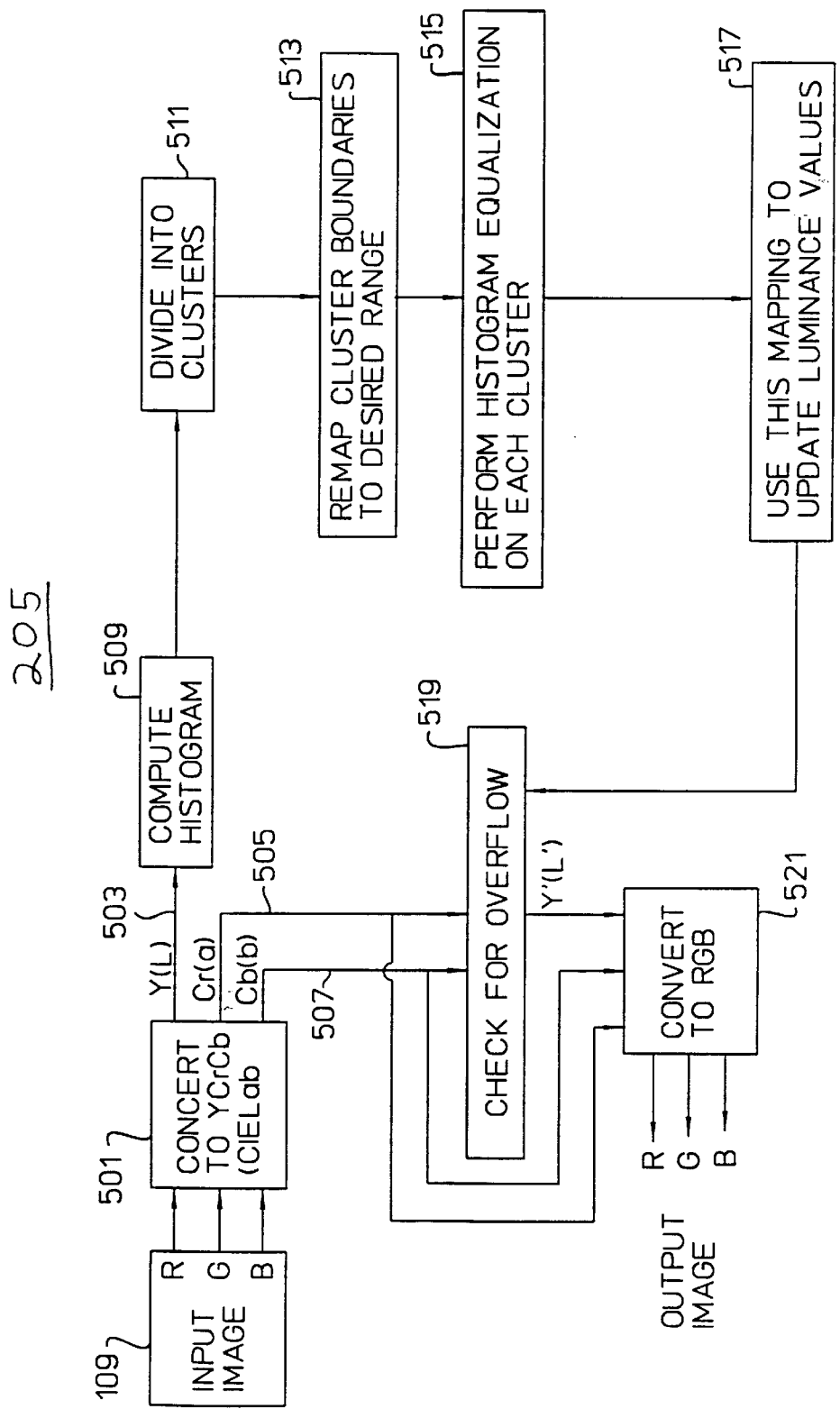
FIG. 5 shows a block diagram of the operation of a contrast enhancer according to the present invention.

FIG. 5 shows a block diagram of the operation of the contrast enhancer 205 according to the present invention. The contrast enhancer 205 first divides the luminance histogram into clusters. The contrast enhancer 205 next performs histogram equalization or stretching on each cluster separately, and the entire cluster is remapped to a new luminance region based on the cluster width, the number of pixels in the cluster, and the original histogram extent.

The chrominance information is used to limit the modified luminance values prior to remapping the pixel values to avoid color shifts due to saturation.

D. Color Transformation

In a first embodiment of the present invention the contrast enhancement is based on luminance values. Therefore, in that embodiment, first, the contrast enhancer 205 converts the RGB image data of an input image 109 to a luminance-chrominance representation, step 501.

In general terms, the present invention is equally applicable to all color image representations. However, the particular method used will vary from representation to representation. For exemplary purposes, the description below of the preferred embodiments of the present invention considers input images 109 as having been stored using the RGB components specified by the Society of Motion Picture and Television Engineers (SMPTE-C RGB). The white point is taken to be the standard CIE D65 white point, and the gamma is assumed to be either 1 (linear RGB) or 2.2 (gamma corrected for NTSC). The transformation and hence the contrast enhancement results will vary somewhat if different basis values are assumed, however it has been found that these assumptions work well for color images that are designed to be viewed on a computer monitor. A more detailed discussion of these parameters is given in R. W. G. Hunt, *The Reproduction of Colour in Photography, Printing & Television*, Fountain Press, Tolworth, England, 1987.

Of course, a color image 109 may have been stored in a format containing a luminance component, in which case the contrast enhancer 205 can skip the transformation step 501. One embodiment uses the YCrCb color space. Alternative embodiments, use CIELab, YUV, or YIQ color spaces.

In one embodiment of the invention, YCrCb is selected because it is a convenient representation for digital processing because the chrominance components have easily computed maximum and minimum values. For example, if the RGB components each have an allowable range of 0 to 255, Y will fall between 0 and 255 as well, and the Cr and Cb values will both be between −127 and 128. A gamma corrected RGB image can be converted to YCrCb using a simple linear transformation. Specifically,

Y=0.299R+0.587G+0.114B

Cr=0.713(R−Y)

Cb=0.564(B−Y).

The CIELab color space, which was designed to be approximately perceptually uniform, is often used for digital image compression and transmission. The conversion to CIELab is somewhat more complicated, since the CIELab color space is defined in terms of the standard CIE XYZ color space. For gamma corrected RGB, this transformation is computed in three stages. First, convert to linear RGB.

$$R_1 = 255\left(\frac{R}{255}\right)^{2.2} \quad G_1 = 255\left(\frac{G}{255}\right)^{2.2} \quad B_1 = 255\left(\frac{B}{255}\right)^{2.2}$$

Next, a linear transformation is used to convert to CIE XYZ.

$$\begin{bmatrix} X \\ Y \\ Z \end{bmatrix} = \begin{bmatrix} .3935 & .3653 & .1916 \\ .2124 & .7011 & .0866 \\ .0187 & .1119 & .9582 \end{bmatrix} \begin{bmatrix} R_1 \\ G_1 \\ B_1 \end{bmatrix}$$

Finally, the data is converted to CIELab via the following equations.

$$L = 116 f\left(\frac{Y}{100}\right) - 16$$

$$a = 500\left(f\left(\frac{X}{95.4}\right) - F\left(\frac{Y}{100}\right)\right)$$

$$b = 200\left(f\left(\frac{Y}{100}\right) - f\left(\frac{Z}{108.89}\right)\right)$$

where $$f(t) = \begin{cases} t^{\frac{1}{3}} & t > .008856 \\ 7.7867t + .13793 & t \le .008856 \end{cases}$$

In one embodiment of the invention, these transformations are scaled and translated to produce integer values between 0 and 255 for all color components. In alternative embodiments, images may be digitized to other "bits-per-pixel" formats, e.g., four or sixteen. In those embodiments, the transformations are scaled to ranges appropriate for those formats.

E. Luminance Histogram Clustering

After the color transformation, the data will consist of a luminance component 503 and two chrominance components 505 and 507. Next, the contrast enhancer 205 calls upon the histogram generator 209 to construct the luminance histogram 211 from the luminance data 503, step 509. The histogram 211 is then input into clusterizer 213 to be divided into clusters, step 511. Assuming that luminance is recorded using one byte per pixel, the histogram 211 is a one dimensional array with 256 elements, so the required computation for clustering is independent of image size.

Figure 6:
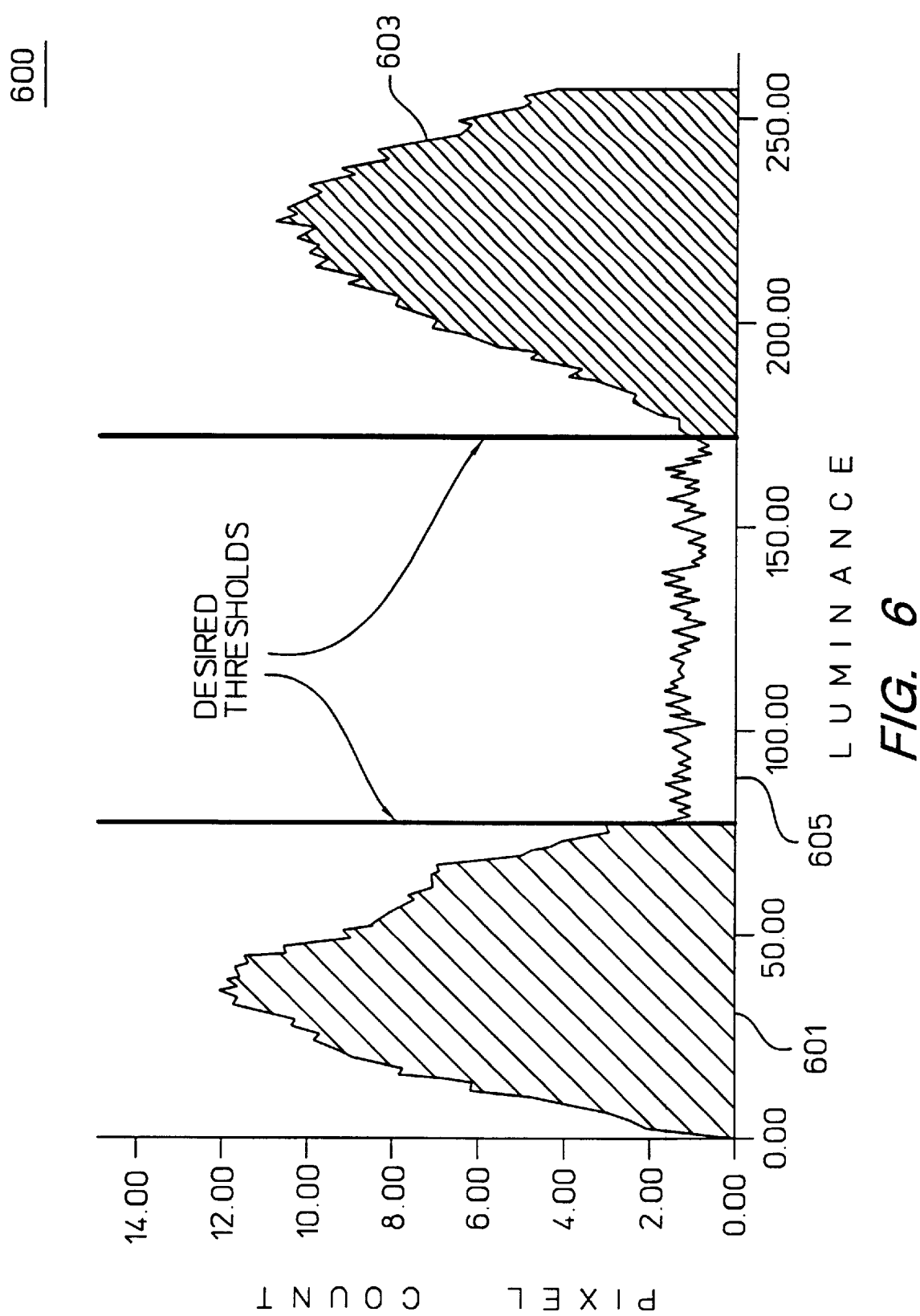
FIG. 6 is an exemplary luminance histogram showing two peaks separated by a flat-region.

The remapping of luminance values is based partially on cluster extent. Therefore, the exact threshold locations can be quite important. The clusterizer 213 strives to divide the histogram such that flat regions are separate clusters, as illustrated in FIG. 6. FIG. 6 is an exemplary luminance histogram 600 having two peaks, one 601 in the low-luminance range and one 603 in the high-luminance range. These two peaks 601 and 603 are separated by a flat region 605 with low pixel counts. The clusterizer 213 strives to divide the exemplary histogram 600 such that flat-region 605 is a separate cluster.

The clusterizer 213 uses a maximum likelihood technique for splitting clusters in conjunction with a tree growing algorithm to determine the next cluster to split. Initially the clusterizer 213 views the histogram 211 as a single cluster, and successively splits existing clusters to generate the final result of a histogram 211 divided into several clusters.

Figure 7:
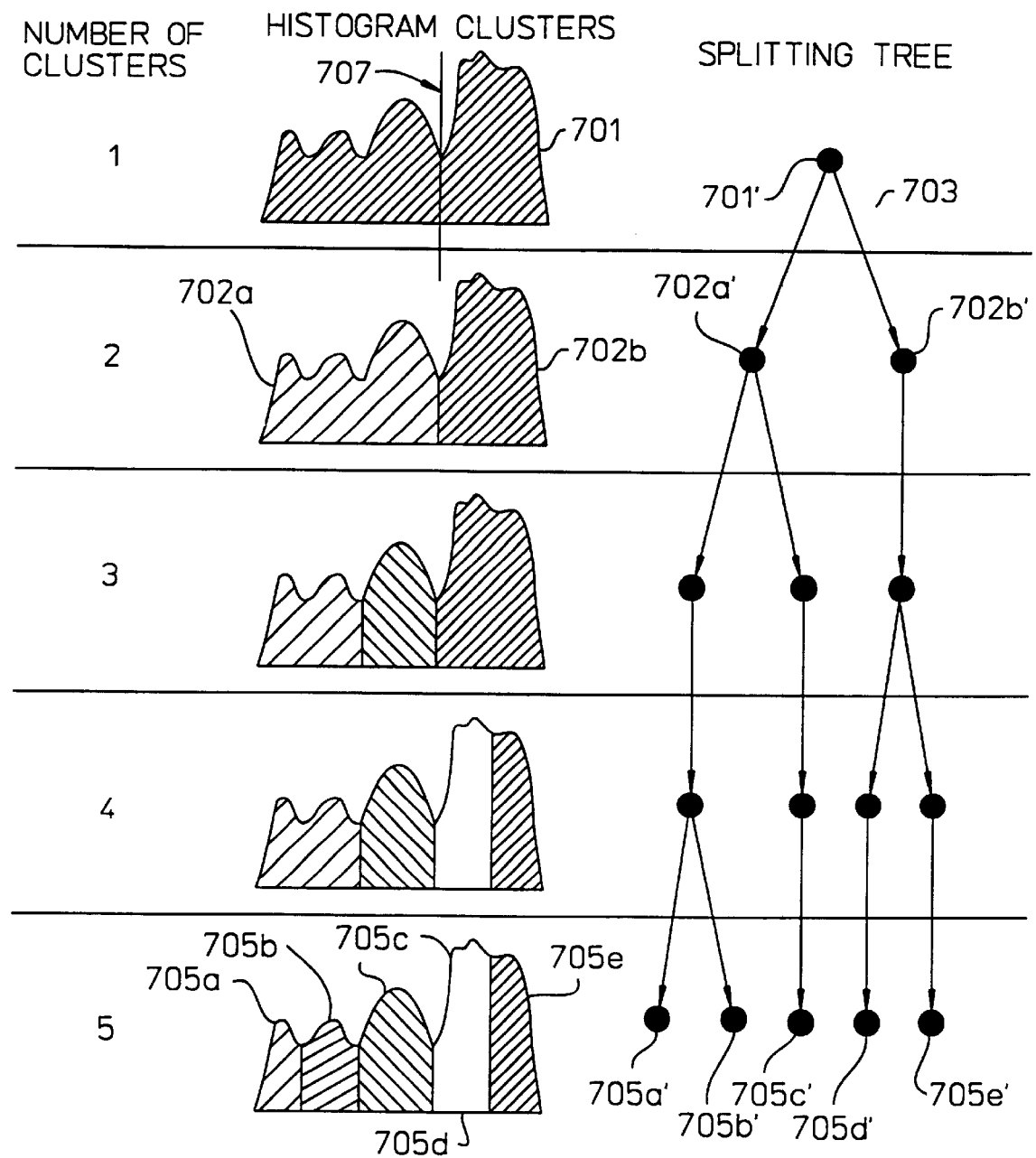
FIG. 7 graphically shows the division of a histogram into several clusters.
Figure 8:
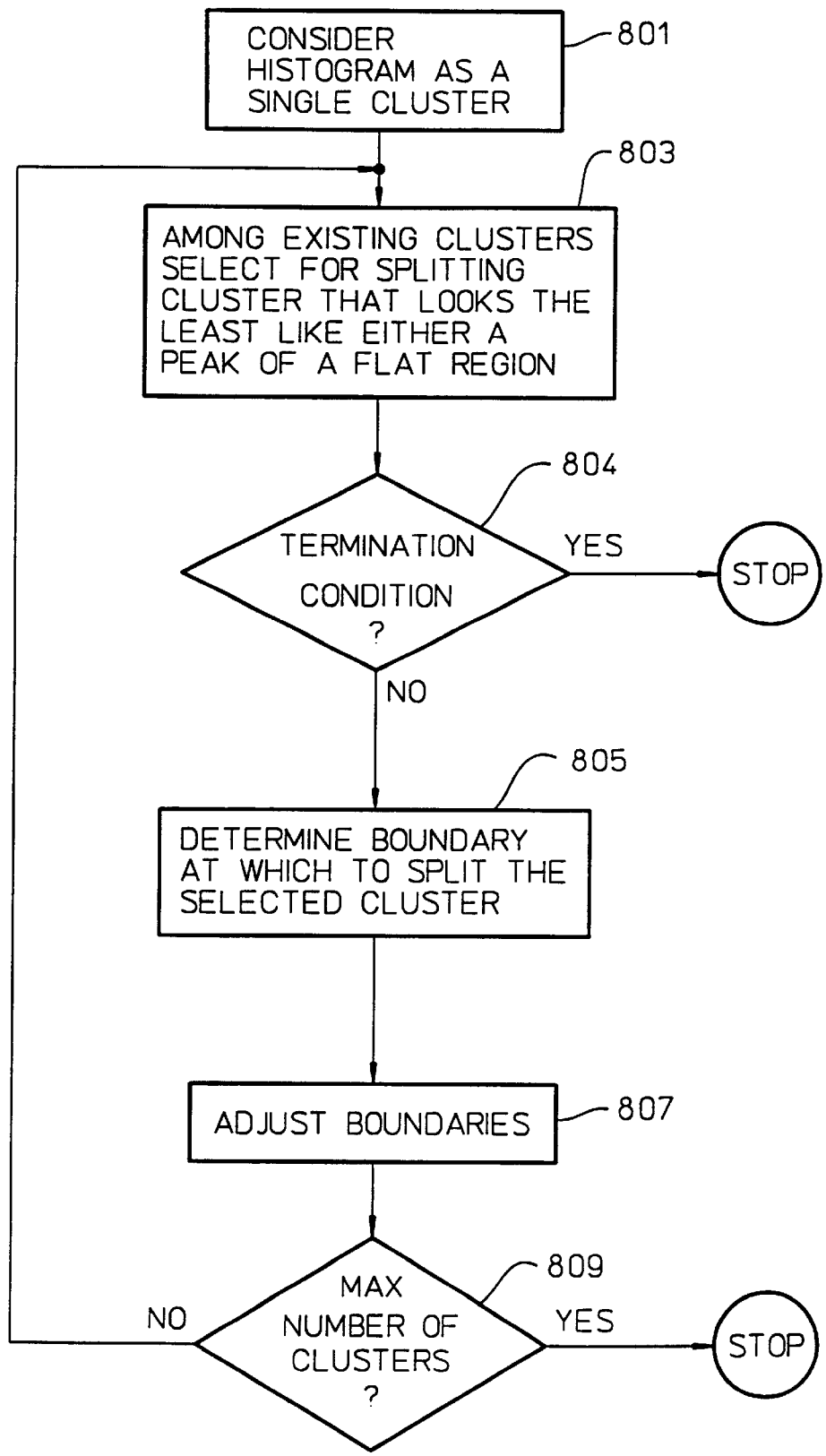
FIG. 8 is a flow chart of the clusterizing procedure according to the present invention.

The procedure used by the clusterizer 213 is illustrated in FIG. 7 and a flow-diagram of the procedure is shown in FIG. 8. Initially the histogram 211 is viewed as one cluster 701, step 801. The cluster 701 is represented in a splitting tree 703 as node 701'. Next, the cluster 701 is split into two clusters 702a' and 702b, which in turn are represented in the splitting tree 703 as nodes 702a' and 702b'. After several iterations, the histogram has been split into clusters 705a–e, corresponding to leaf-nodes 705a' through 705e' in the splitting tree 703.

To decide which cluster to split, the clusterizer 213 searches among the existing clusters for the cluster that looks the least like a peak or a flat-region, step 803. To make that determination, the clusterizer 213 computes two different log likelihoods for each existing cluster, first assuming a Gaussian distribution and then a uniform distribution. A Gaussian distribution is taken to approximate a peak, and a uniform distribution is taken to approximate a flat-region. Therefore, a cluster that deviates a great deal from both a Gaussian distribution and a uniform distribution is a good candidate to split into additional clusters.

The data values in each cluster are assumed to be independent and identically distributed (iid), and the parameters of the Gaussian distribution are taken to be the values that maximize the log likelihood. The log likelihood equations for a given cluster C under the Gaussian and uniform assumptions can thus be computed via (1) and (2), respectively.

$$LL_G = -\frac{N}{2}(1 + \log(2B\hat{r}^2)) \quad (1)$$

$$LL_U = -N\log(|C|) \quad (2)$$

where $$N = \sum_{i \in C} hist[i]$$

$$\hat{m} = \frac{1}{N}\sum_{i \in C} i \, hist[i]$$

$$\hat{r}^2 = \frac{1}{N}\sum_{i \in C} (i - \hat{m})^2 hist[i]$$

$$|C| = \sum_{i \in C} 1$$

and the array value hist[i] is the number of image pixels in histogram bin i.

The log likelihood associated with each cluster is then taken to be the maximum of (1) and (2). The cluster with minimum log likelihood is chosen as the next cluster to split. Thus, the algorithm chooses the existing cluster that looks the least like either a Gaussian or a uniform density. The average (per pixel) log likelihood of the chosen cluster is stored for each split. When this value is large enough in comparison with the value for the previous split, the clustering procedure terminates, step 804. The exact stopping criterion is given in Table 1: pseudo-code for algorithm to divide histogram into clusters.

initialize oldll=∞, Newll=0, and M=1
while (M<MaxM)
   for i=1 to M
      use (1) to compute $LL_G(i)$
      use (2) to compute $LL_U(i)$
      set LL(i) to max ($LL_G(i)$, $LL_U(i)$)
      set N(i)=number of pixels in cluster i
   set c=arg min.$_{i=1 \ldots M}$ ( LL(i))
   set Newll=LL(c)/N(c)
   if (Newll>0.8*Oldll) Stop
   reindex clusters c+1 . . . M to c+2 . . . M+1
   use (5) to split cluster c into 2 new clusters indexed c and c+1
   if (c>1) recompute boundary between c−1 and c using (5)
   if (c<M) recompute boundary between c+1 and c+2 using (5)
   set M=M+1
   set Oldll=Newll
terminate with M clusters Table 1: Pseudo-code for algorithm to divide histogram into clusters.

After selecting a cluster to split, the clusterizer 213 determines the point, within the range represented by the cluster, to split that cluster, step 805. To select the boundary point, the clusterizer 213 looks for uniformity in the histogram patterns on either side of the boundary point. For example, in the cluster 701 of FIG. 7, the pixel counts in histogram bins left of the dividing line 707 are all relatively low and the pixel counts in the histogram bins to the right of dividing line 707 are relatively high. Therefore, the index at dividing line 707 is selected as the splitting boundary.

As a first step to select the boundary between the two new clusters, the clusterizer 213 models the data within the selected cluster as iid random samples from a mixture distribution. The distributions in the mixture are both discrete uniform distributions U (.,.), with the first extending from histogram bin l through bin m−1 and the second from m through r−1, where the cluster extends from l through r−1 and m is between l and r. Each data value in the cluster is U(l,m) with some probability D and U(m,r) with probability (1−D). The likelihood of the histogram data y in the cluster is thus $$p(y|m, D) = \left(\frac{D}{m-1}\right)^{N_1}\left(\frac{1-D}{r-m}\right)^{N-N_1}, \quad (3)$$

where $$N_1 = \sum_{i=1}^{m-1} hist[i].$$

To select the boundary at which to split the selected cluster, the clusterizer 213 seeks to pick m and D values such as to maximize (3). The value m will then be the boundary between the two new clusters. Taking the log of (3) gives $$\log p(y|m, D) = N_1 \log\left(\frac{D}{m-1}\right) + (N - N_1)\log\left(\frac{1-D}{r-m}\right). \quad (4)$$

The maximum likelihood estimate of D is computed by setting the partial derivative of (4) with respect to D to zero. This gives $D = N_1/N$. Substituting into (4), selection of the boundary point is done by maximizing the following function of m:

$$\log p(y|m, D) = N_1 \log\left(\frac{N_1}{N(m-1)}\right) + (N - N_1)\log\left(\frac{N - N_1}{N(r-m)}\right) \quad (5)$$

$$= -N\log(r-1) + ND\left(\frac{N_1}{N} \Big\| \frac{m-1}{r-1}\right),$$

where $$D(p\|q) = p\log\left(\frac{p}{q}\right) + (1-p)\log\left(\frac{1-p}{1-q}\right)$$

is the Kullback-Leibler distance between two binomial distributions with probabilities p and q, respectively (S. Kullback and R. A. Leibler, On information and sufficiency. *Annals of Mathematical Statistics*, 22:79–86, 1951). Note that $N_1$ is a function of m.

The clusterizer 213 maximizes (5) using an exhaustive search on l+1, . . . , r−1. This search gives the boundary between the two new clusters.

Finally, the cluster boundaries to either side of the original cluster are recomputed given the result of the split, step 807. Table 1 is a pseudo-code listing of the clustering algorithm.

In addition to terminating as described above in conjunction with Step 804, the procedure also terminates if the original histogram has been split into a maximum number of clusters, step 809.

F. Luminance Remapping

After the clusterizer 213 has divided the luminance histogram into clusters, the contrast enhancer 205 calls upon the histogram luminance remapper 217 to remap the luminance values to new values based on cluster width, the number of pixels in each cluster, and the original histogram extent, step 513 of FIG. 5.

Let $N(i)$ = number of pixels in cluster $i$ $Nt$ = total number of pixels in the image $l(i), r(i)$ = left and right limits of cluster $i$ before modification, $Ro$.

$l'(i), r'(i)$ = left and right limits of cluster $i$ after modification $a, b$ = left and right limits of histogram before modification, $Eo$.

$a', b'$ = desired left and right limits of histogram after modification, $Ed$.

where a and b are defined to be the tightest bounds such that less than 1% of the image pixels fall to either side of the interval [a, ..., b−1]. Given the desired values for a' and b', the luminance histogram remapper 217 remaps the cluster boundaries according to $$l'(i) = \begin{cases} a' & i = 1 \\ r'(i-1) & i > 1 \end{cases} \quad (6)$$

$$r'(i) = l'(i) + \left\{ w\left(\frac{N(i)}{N_t}\right) + (1-w)\left(\frac{r(i)-l(i)}{(b-a)}\right) \right\}(b' - a'), \quad (7)$$

where the parameter w is a weighting factor between 0 and 1. The maximum dynamic range is achieved by setting a' and b' to the allowable limits, usually 0 and 256, respectively. However, most computer monitors and printers contain an offset below which all values map to black. The offset can vary from about 30 to 70 depending on the output device. In such applications, these parameters are set as follows: a'=30, b'=256 as the desired range.

G. Histogram Equalization on Clusters

After the histogram remapper 217, using (6) and (7), has computed the new cluster boundaries, histogram equalization is performed, step 515, by histogram equalizer/stretcher 219, on each cluster separately so the remapped data within each cluster is distributed as close to uniformly as possible, step 517. Alternatively, the histogram equalizer/stretcher 219 can be used to stretch the data, so that the remapped data extends to the cluster boundaries but the shape of the histogram within a cluster remains unchanged.

FIG. 9 shows the results of performing this modification on a given image histogram. In this example, the remapping was performed using weighting factors of 0, 0.5, and 1. The spikes that appear in the modified histograms are due to quantization effects during the pixel remapping, step 517. The data in any histogram bin can be remapped to a different value, but it cannot be split among multiple bins. For example, suppose bins 100 through 102 each contain 1000 pixels initially. If we wish to remap this range to bins 110 through 113, we have 3 input bins being mapped to 4 output bins. One of the output bins (110, 111, 112, or 113) must therefore be empty while the other three contain 1000 pixels apiece. This will result in a downward spike in the output histogram. Similarly, if a given input range is mapped to a smaller output range, upward spikes will result. Both effects can be seen in FIGS. 9b–d.

Figure 9A:
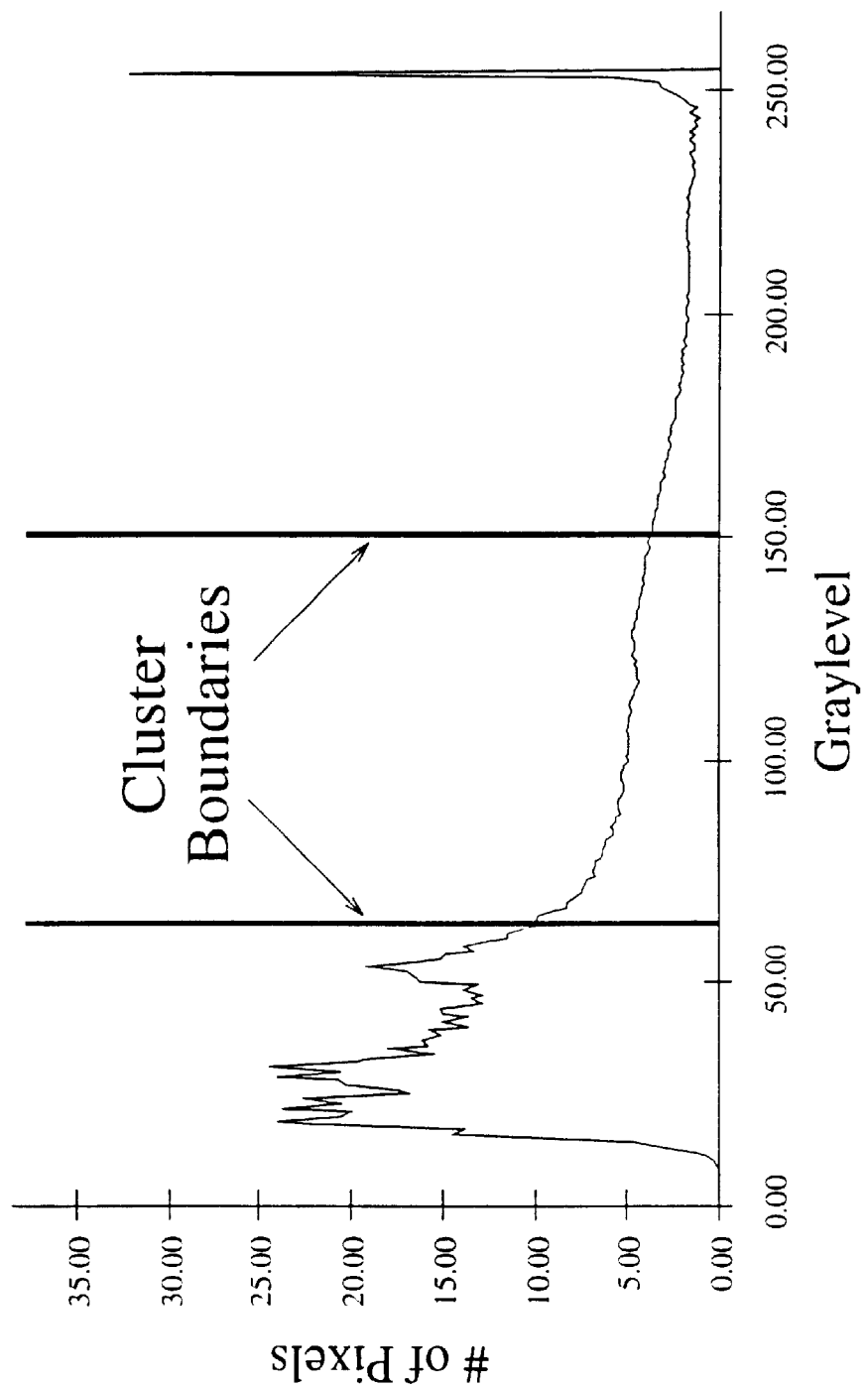
FIGS. 9*a* is an exemplary unmodified luminance histogram.
Figure 9B:
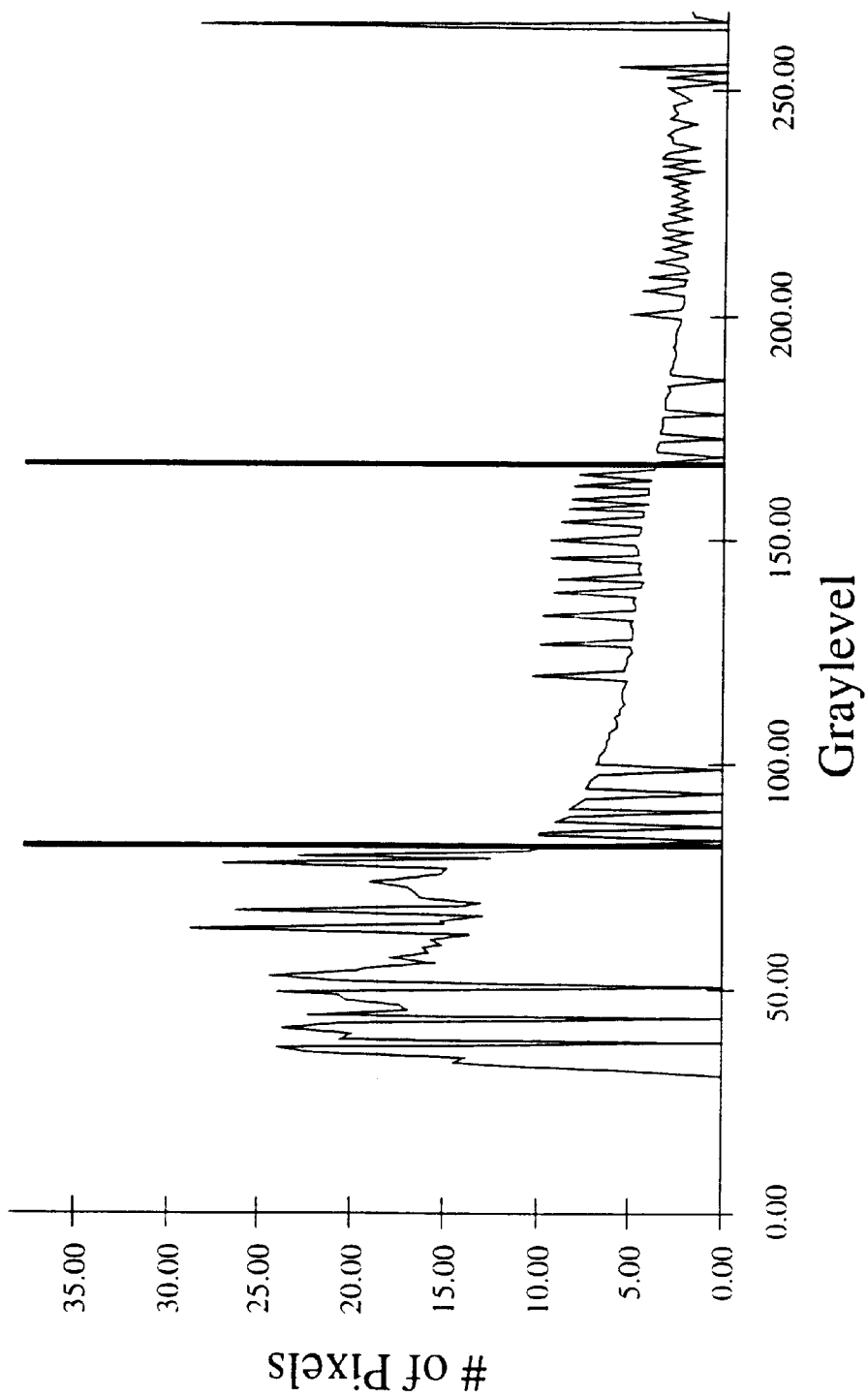
FIGS. 9*b*, 9*c*, and 9*d* are luminance histograms modified by the contrast enhancer of the present invention using different parameter values.
Figure 9C:
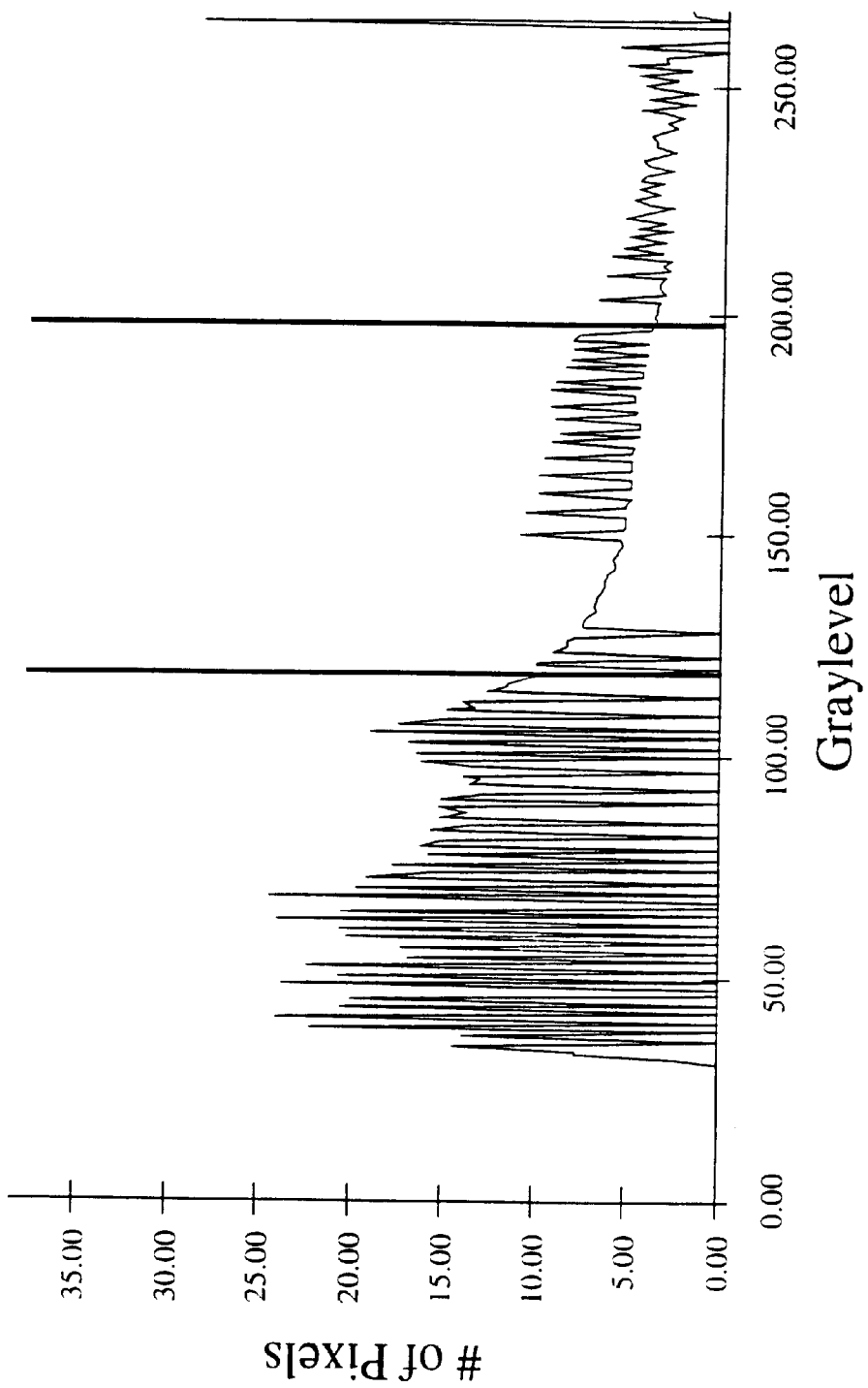
Figure 9D:
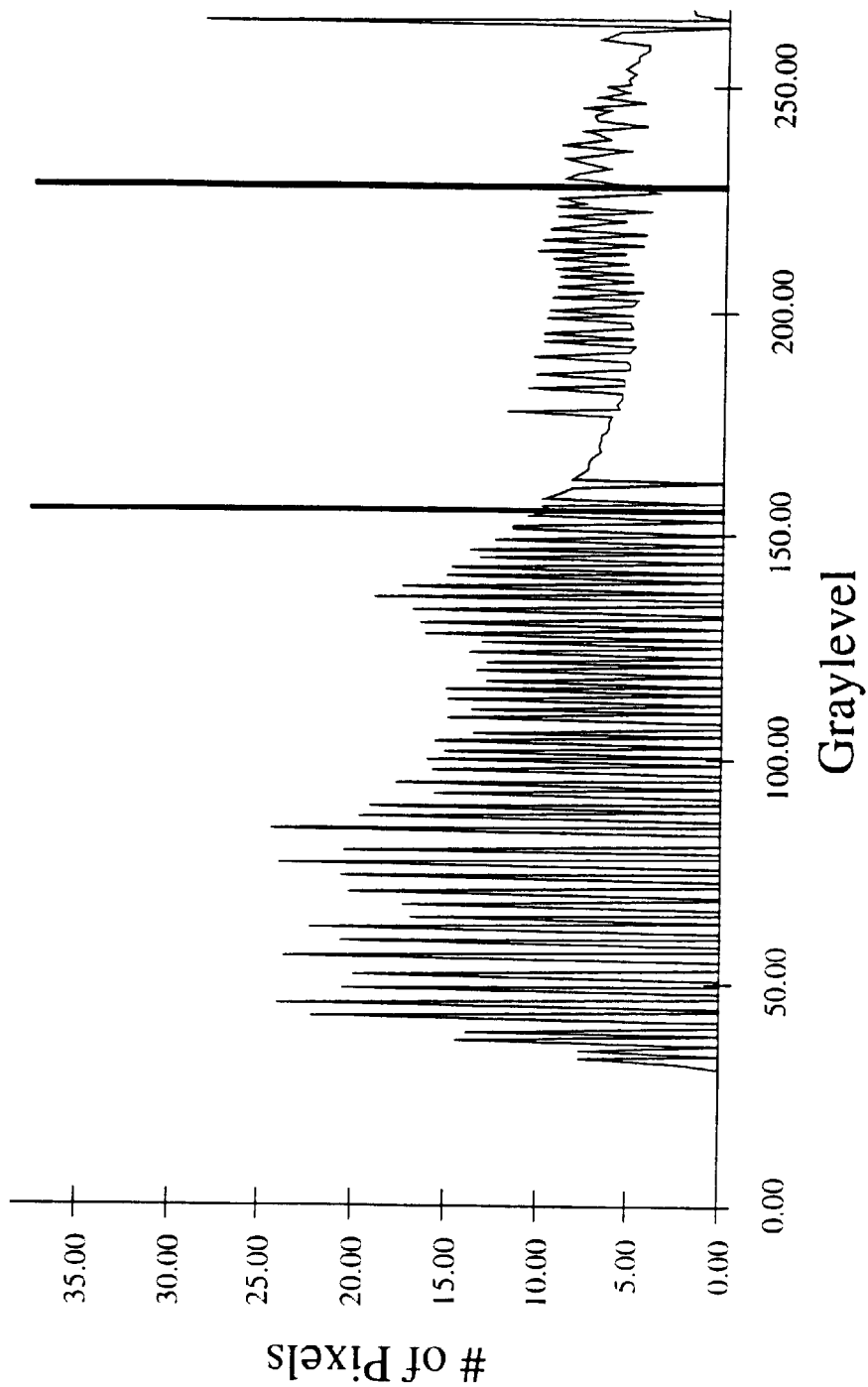

Note that a weighting factor of w=0 in (7) will result in the relative cluster widths remaining unchanged after the remapping. This can limit the amount of contrast enhancement to too modest a level for images with clusters at both bright and dark luminance levels, as illustrated in FIG. 9b.

A weighting factor of w=1, on the other hand, gives exactly the same mapping as histogram equalization performed on the entire histogram; the clusters do not affect the mapping. As noted earlier, this can cause excessive luminance shifts for some images. In the preferred embodiment, a weighting factor of 0.5 is used, because this weighting factor has been found to result in good image quality over a large range of images.

H. Using Chrominance Values to Prevent Overflow

Thus far the remapping of pixel values has depended only on the luminance component. However, the maximum allowable luminance value for a pixel depends on the chrominance of that pixel. If the luminance value exceeds this maximum, at least one of the color components will be greater than the saturation level (usually 255) when the value is transformed back to RGB. To prevent this overflow from occurring, the contrast enhancer 205 calls upon a data checker 221 to use the chrominance values for each pixel to set a luminance threshold, step 519. If the remapped luminance exceeds this threshold for a given pixel, the data checker 221 sets the pixel luminance to the threshold value.

The computation of a luminance threshold given the chrominance values is straightforward for the YCrCb color space since Cr is proportional to R-Y and Cb is proportional to B-Y. For the YCrCb color space, we can easily insure that the red and blue components are not driven into saturation. In practice, color shifts are very visible in skin tones, which are predominantly red, and in sky, for which blue dominates. However, saturation of the green component is generally less visible than for red and blue, so in an embodiment of the present invention wherein computations are reduced, green component overflow check is not necessary in YCrCb implementation of the present invention.

For the CIELab color space the overflow checking is less straightforward. There is no simple way to relate the overflow of a specific RGB component to Lab values. Therefore, in a CIELab embodiment of the present invention a two dimensional lookup table, indexed by the quantized a and b values, that contains the luminance threshold, is employed. To construct the look-up table, the eight corners of RGB space (RGB=(0,0,0), (0,0,255), (0,255,0), etc.) were first converted to CIELab color space. The corner values constitute eight values for the lookup table. The table is filled in using bilinear interpolation between these corner values. The resulting thresholds are not precisely correct, but any overflow errors that still occur are small enough that only minor color shifts result. Thus, visual degradation is kept small. This procedure requires a 256×256 lookup table of unsigned characters, but its operation is very fast. Alternatively, the bilinear interpolation could be performed for each image pixel in turn, which would not require the extra memory but would be much slower.

I. Convert to RGB Color Space

Finally, having computed remapped values for all pixels in the image 109, the image is converted back to RGB space, step 521. The resulting image may then be stored back into RAM 105 or written onto a hard disk 119. Alternatively, the image may be printed on a printer 115 or output on another output device.

J. Conclusion

The contrast enhancer 205 of the present invention may be used to improve the image quality of an image at any stage in the process flow of FIG. 3. For example, an input device, such as a digital camera may include a contrast enhancer 205 and improve the contrast of an image prior to transferring the image to a computer 101. Alternatively, the computer 101 may include the contrast enhancer 205 to improve image quality of images prior to printing or displaying the images. The contrast enhancer 205 may also be incorporated into image processing software packages such as computerized "dark-rooms". Yet another alternative use of a contrast enhancer 205 according to the present invention is as part of a printer driver 126. A further alternative is to place the contrast enhancer 205 "on-board" an output device, e.g., a printer 115 in its internal control mechanism.

I claim:

1. A method of operating a computer to produce contrast enhanced images, wherein an image is composed of a plurality of pixels, said method comprises the steps of:
   inputting in digital form an original image into a storage unit of said computer;
   producing a histogram of said digital form having a first axis corresponding to a first measurable property and a second axis corresponding to a count of pixels having a particular value for said first measurable property;
   dividing said histogram into clusters;
   performing histogram equalization on each cluster thereby producing a modified histogram; and
   using said modified histogram to adjust the value of said first measurable property in said digital form, thereby producing said contrast enhanced image.

2. The method of claim 1 wherein said dividing step comprises the step of partitioning the histogram into clusters of equal size.

3. The method of claim 1 wherein said dividing step comprises the step of detecting a first pattern approximating a peak-region in the histogram and detecting a second pattern approximating a flat-region in the histogram and dividing the histogram into clusters based on the first pattern and the second pattern.

4. The method of claim 3 wherein said pattern recognition comprises the steps of detecting regions in said histogram that resemble Gaussian distributions and detecting other regions in said histogram that resemble uniform distributions.

5. The method of claim 1 wherein in said step of inputting an image, said image is an RGB image and further comprising the step of:
   converting said RGB image into a format having a luminance component.

6. The method of claim 5 wherein said format is selected from the set of Y-Cb-Cr, CIE L*a*b*, CIE XYZ, and Y-U-V.

7. The method of claim 1, wherein said first measurable property is a light intensity measure and wherein for each light intensity value said count of pixels is a count of pixels having that particular light intensity, and wherein said histogram has an extent equal to the highest and lowest light intensity values in said original image, each cluster represents a range in said histogram, the sum of the histogram values for the range corresponds to the number of pixels having a light intensity within the range of the cluster, and further comprising the step of:
   remapping cluster boundaries according to the cluster's range (Ro), the number of pixels within the range (Ni), the total number of pixels in the image (Nt), and the histogram extent (Eo).

8. The method of claim 7 wherein said remapping step comprises the further step of selecting a desired range for the histogram (Ed) of said output image; and stretching the width of each cluster according to the relationship:

$$R_n = \left(w\left(\frac{N_i}{N_t}\right) + (1-w)\left(\frac{R_o}{E_o}\right)\right)E_d$$

wherein w is a weighting factor ranging from 0 to 1.0.

9. The method of claim 1 wherein said digital form of said image further comprises a second measurable property and wherein said generating step further comprises the step of:
   for each pixel in said contrast enhanced image limiting the value of said first measurable property as a function of the value of said second measurable property.

10. The method of claim 9 further comprising the steps of:
    generating a table of maximum values of said first measurable property as a function of said second measurable property; and
    wherein said limiting step further comprises the step of for each value V of said second measurable property retrieving from said table the maximum value M for said first measurable property corresponding to said value V and if said value V exceeds said maximum value M setting the value V to M.

11. An image processing system, having a memory, for producing contrast enhanced images, comprising:
    a histogram producing unit operable to produce a histogram data structure in said memory, said histogram corresponding to an image composed of a plurality of pixels, and said histogram containing, for each level of a first property of said pixels, a count of pixels having a value for said first property corresponding to said level, thereby defining an extent for said histogram corresponding to a range represented by the lowest such level having a non-zero count and the highest such level having a non-zero count;
    a clusterizer connected to said histogram data structure and operable to partition said histogram data structure into clusters;
    a histogram cluster boundary adjuster connected to said histogram data structure and operable to adjust boundaries of each cluster in said data structure such that said boundaries conform to a function having the parameters cluster width (Ro), a count of pixels in the cluster (Ni), a count of pixels in the image (Nt), the original histogram extent (Eo), and a desired histogram extent (Ed); and
    a histogram adjuster connected to said histogram data structure and operable to modify the histogram for each such cluster according to a desired characteristic,
    wherein said histogram adjuster is a histogram equalizer and said desired characteristic is uniform distribution of pixels contained in said cluster.

12. An image processing system, having a memory, for producing contrast enhanced images, comprising:
    a histogram producing unit operable to produce a histogram data structure in said memory, said histogram corresponding to an image composed of a plurality of pixels, and said histogram containing, for each level of a first property of said pixels, a count of pixels having a value for said first property corresponding to said level, thereby defining an extent for said histogram corresponding to a range represented by the lowest such level having a non-zero count and the highest such level having a non-zero count;
    a clusterizer connected to said histogram data structure and operable to partition said histogram data structure into clusters;

a histogram cluster boundary adjuster connected to said histogram data structure and operable to adjust boundaries of each cluster in said data structure such that said boundaries conform to a function having the parameters cluster width (Ro), a count of pixels in the cluster (Ni), a count of pixels in the image (Nt), the original histogram extent (Eo), and a desired histogram extent (Ed); and a histogram adjuster connected to said histogram data structure and operable to modify the histogram for each such cluster according to a desired characteristic, wherein said histogram adjuster is a histogram stretcher and said desired characteristic is conformance of the histogram extend to said desired histogram extent (Ed) for each cluster.

13. An image processing system, having a memory, for producing contrast enhanced images, comprising:

a histogram producing unit operable to produce a histogram data structure in said memory, said histogram corresponding to an image composed of a plurality of pixels, and said histogram containing, for each level of a first property of said pixels, a count of pixels having a value for said first property corresponding to said level, thereby defining an extent for said histogram corresponding to a range represented by the lowest such level having a non-zero count and the highest such level having a non-zero count;

a clusterizer connected to said histogram data structure and operable to partition said histogram data structure into clusters;

a histogram cluster boundary adjuster connected to said histogram data structure and operable to adjust boundaries of each cluster in said data structure such that said boundaries conform to a function having the parameters cluster width (Ro), a count of pixels in the cluster (Ni), a count of pixels in the image (Nt), the original histogram extent (Eo), and a desired histogram extent (Ed); and a histogram adjuster connected to said histogram data structure and operable to modify the histogram for each such cluster according to a desired characteristic, and wherein said function is:

$$R_n = \left( w\left(\frac{N_i}{N_t}\right) + (1-w)\left(\frac{R_0}{E_0}\right) \right) E_d$$

wherein w is a weighting factor ranging from 0 to 1.0.

14. An image processing system, having a memory, for producing contrast enhanced images, comprising:

a histogram producing unit operable to produce a histogram data structure in said memory, said histogram corresponding to an image composed of a plurality of pixels, and said histogram containing, for each level of a first property of said pixels, a count of pixels having a value for said first property corresponding to said level, thereby defining an extent for said histogram corresponding to a range represented by the lowest such level having a non-zero count and the highest such level having a non-zero count;

a clusterizer connected to said histogram data structure and operable to partition said histogram data structure into clusters;

a histogram cluster boundary adjuster connected to said histogram data structure and operable to adjust boundaries of each cluster in said data structure such that said boundaries conform to a function having the parameters cluster width (Ro), a count of pixels in the cluster (Ni), a count of pixels in the image (Nt), the original histogram extent (Eo), and a desired histogram extent (Ed); and a histogram adjuster connected to said histogram data structure and operable to modify the histogram for each such cluster according to a desired characteristic, and wherein said clusterizer partitions said histogram into equal size clusters.

15. An image processing system, having a memory, for producing contrast enhanced images, comprising:

a histogram producing unit operable to produce a histogram data structure in said memory, said histogram corresponding to an image composed of a plurality of pixels, and said histogram containing, for each level of a first property of said pixels, a count of pixels having a value for said first property corresponding to said level, thereby defining an extent for said histogram corresponding to a range represented by the lowest such level having a non-zero count and the highest such level having a non-zero count;

a clusterizer connected to said histogram data structure and operable to partition said histogram data structure into clusters;

a histogram cluster boundary adjuster connected to said histogram data structure and operable to adjust boundaries of each cluster in said data structure such that said boundaries conform to a function having the parameters cluster width (Ro), a count of pixels in the cluster (Ni), a count of pixels in the image (Nt), the original histogram extent (Eo), and a desired histogram extent (Ed); and a histogram adjuster connected to said histogram data structure and operable to modify the histogram for each such cluster according to a desired characteristic, and wherein said clusterizer further comprises a pattern recognizer operable to detect areas approximating uniform distribution and areas approximating Gaussian distribution, and partitioning the histogram on boundaries between such areas.

16. An apparatus for improving the visual appearance of digitized images stored in an image data structure, by contrast enhancement, comprising:

a histogram data structure;

a histogram generator connected to said histogram data structure and operable to store in said histogram data structure histogram data for a first property of said images;

a histogram clusterizer connected to said histogram data structure and operable to define clusters in said histogram, wherein each such cluster has a range;

a histogram remapper connected to said histogram data structure and operable to adjust said range of each such cluster; and a histogram adjuster connected to said histogram data structure and operable to adjust the histogram of each cluster, wherein said histogram adjuster is a histogram equalizer.

17. An apparatus for improving the visual appearance of digitized images stored in an image data structure, by contrast enhancement, comprising:

a histogram data structure;

a histogram generator connected to said histogram data structure and operable to store in said histogram data structure histogram data for a first property of said images;

a histogram clusterizer connected to said histogram data structure and operable to define clusters in said histogram, wherein each such cluster has a range;

a histogram remapper connected to said histogram data structure and operable to adjust said range of each such cluster; and a histogram adjuster connected to said histogram data structure and operable to adjust the histogram of each cluster, wherein said histogram adjuster is a histogram stretcher.

* * * * *